(12) United States Patent
Carton

(10) Patent No.: US 12,352,007 B2
(45) Date of Patent: Jul. 8, 2025

(54) ELECTRIC WORK VEHICLE

(71) Applicant: YANMAR HOLDINGS CO., LTD., Osaka (JP)

(72) Inventor: Alexandre Carton, Saint-Dizier (FR)

(73) Assignee: YANMAR HOLDINGS CO., LTD., Osaka (JP)

( * ) Notice: Subject to any disclaimer, the term of this patent is extended or adjusted under 35 U.S.C. 154(b) by 402 days.

(21) Appl. No.: 17/943,672

(22) Filed: Sep. 13, 2022

(65) Prior Publication Data

US 2024/0018745 A1 Jan. 18, 2024

(30) Foreign Application Priority Data

Jul. 15, 2022 (EP) .................................... 22315155

(51) Int. Cl.
*E02F 9/08* (2006.01)
*B60K 11/02* (2006.01)
*E02F 9/22* (2006.01)
*F15B 15/18* (2006.01)
*E02F 3/32* (2006.01)

(52) U.S. Cl.
CPC ............ *E02F 9/0866* (2013.01); *B60K 11/02* (2013.01); *E02F 9/0883* (2013.01); *E02F 9/2278* (2013.01); *F15B 15/18* (2013.01); *E02F 3/325* (2013.01)

(58) Field of Classification Search
CPC ......... B60K 11/02; B60K 11/00; F15B 15/18; F15B 15/00; E02F 9/0866; E02F 9/0883; E02F 9/2278; E02F 9/22; E02F 9/2217; E02F 9/00; E02F 9/0858; E02F 9/20; E02F 9/2264; E02F 9/2271; E02F 3/325; E02F 3/28; E02F 3/36; E02F 3/00
See application file for complete search history.

(56) References Cited

U.S. PATENT DOCUMENTS

| 6,182,778 | B1 * | 2/2001 | Henshaw | B66F 9/07545 187/222 |
| 7,849,951 | B2 * | 12/2010 | Borchers | B66F 9/07572 187/222 |
| 8,381,856 | B2 * | 2/2013 | Shimomura | B60K 1/04 180/68.5 |
| 8,631,890 | B2 * | 1/2014 | Noguchi | E02F 9/207 180/311 |
| 8,700,246 | B2 * | 4/2014 | Kurikuma | E02F 9/2246 701/50 |
| 8,727,055 | B2 * | 5/2014 | Matsumura | B62D 21/186 180/68.5 |
| 9,156,341 | B2 * | 10/2015 | Matsumura | B60L 50/51 |
| 9,605,408 | B2 * | 3/2017 | Satake | H01R 33/975 |

(Continued)

FOREIGN PATENT DOCUMENTS

JP 2008-019616 A 1/2008

*Primary Examiner* — James M Dolak
(74) *Attorney, Agent, or Firm* — Future IP LLC; Tomoko Nakajima

(57) ABSTRACT

To install an energy storage device with sufficient capacity thereby to extend operating time of an electric work machine, even for a small electric work machine. A hydraulic excavator, as an electric work machine, includes an electric motor, an energy storage device that stores electric power for driving the electric motor, and a hydraulic pump driven by the electric motor. The electric motor and the hydraulic pump are vertically located alongside.

16 Claims, 9 Drawing Sheets

(56) References Cited

U.S. PATENT DOCUMENTS

| | | | | |
|---|---|---|---|---|
| 9,863,121 B2* | 1/2018 | Huissoon | ............... | E02F 9/0883 |
| 10,066,358 B2* | 9/2018 | Ota | ......................... | F02B 63/04 |
| 10,829,351 B2* | 11/2020 | Wild | ...................... | B60L 50/66 |
| 11,198,600 B2* | 12/2021 | Radtke | .................. | B66F 9/0655 |
| 12,146,295 B2* | 11/2024 | Kitahara | ............... | E02F 9/2228 |
| 12,241,224 B2* | 3/2025 | Furukawa | .............. | B60K 11/06 |
| 2013/0071212 A1* | 3/2013 | Yunoue | ................. | E02F 9/0883 |
| | | | | 414/685 |
| 2013/0078071 A1* | 3/2013 | Noguchi | ................... | B60K 1/04 |
| | | | | 414/719 |
| 2015/0060165 A1* | 3/2015 | Shin | ......................... | B60K 5/12 |
| | | | | 180/65.245 |
| 2015/0284933 A1* | 10/2015 | Shin | ...................... | E02F 9/2075 |
| | | | | 60/484 |

\* cited by examiner

ELECTRIC WORK VEHICLE

This application claims priority under 35 U.S.C. § 119 to European Patent Application No. 22315155.6, filed Jul. 15, 2022, which is incorporated by reference.

TECHNICAL FIELD

The present invention relates to an electric work machine.

BACKGROUND ART

Conventional electric construction machine equipped with an electric motor has been proposed. For example, in the hydraulic excavator as an electrically powered construction machine in Patent Document 1, the battery (energy storage device) is located at the back portion on the body frame, and the electric motor and hydraulic pump are located in front of the battery in the left-right direction.

PRIOR ART DOCUMENT

Patent Document

Patent Document 1: Japanese Unexamined Patent Application Publication No. 2008-019616

SUMMARY OF INVENTION

Technical Problem

In the configuration in which the electric motor and hydraulic pump are located, as shown in the Patent Document 1, it is necessary to secure, on the vehicle body frame, a space to occupy the electric motor and the hydraulic pump separately. This makes it difficult to expand the space for the battery in small hydraulic excavators, where the space for each instrument on the body frame is limited. As a result, it is difficult for small hydraulic excavators to be equipped with large batteries (batteries with sufficient capacity) thereby to extend the operating time of the hydraulic excavator.

The present invention has been made to solve the above problem; it is therefore an object of the present invention to install an energy storage device with sufficient capacity thereby to extend operating time of an electric work machine, even for a small electric work machine.

Solution to Problem

An electric work machine according to an aspect of the present invention includes an electric motor, an energy storage device that stores electric power for driving the electric motor, and a hydraulic pump driven by the electric motor, wherein the electric motor and the hydraulic pump are vertically located alongside.

Advantageous Effects of Invention

According to the above configuration, even a small electric work machine can be equipped with an energy storage device with sufficient capacity thereby to make it possible to extend the operating time of the electric work machine.

DESCRIPTION OF EMBODIMENTS

The following is a description of an embodiment of the present invention based on the drawings.

1. Electric Work Machine

Figure 1:
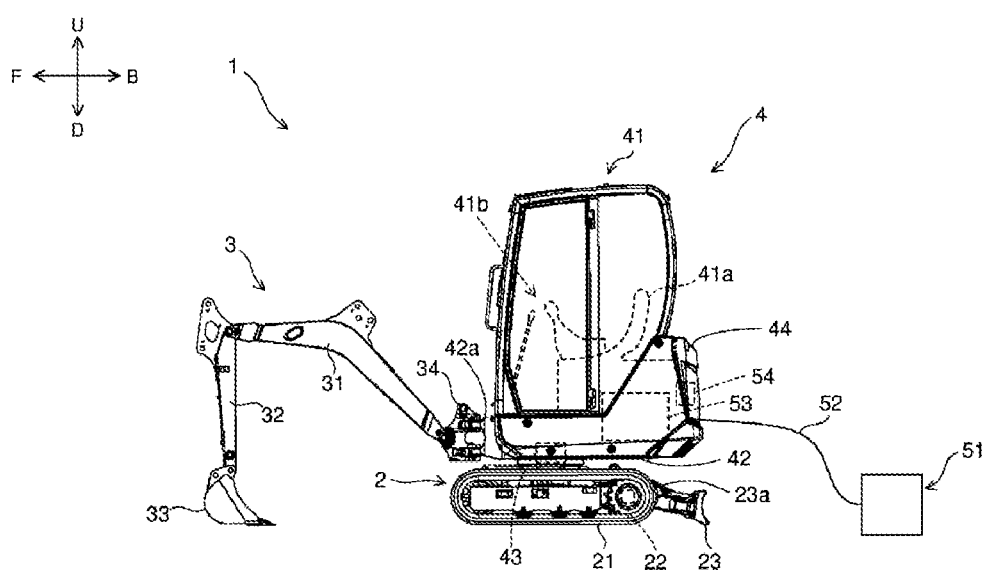
FIG. 1 is a side view showing a schematic configuration of a hydraulic excavator which is an example of an electric work machine according to an embodiment of the present invention.

FIG. 1 is a side view showing a schematic configuration of a hydraulic excavator 1 which is an example of an electric work machine according to the present embodiment. The hydraulic excavator 1 is equipped with a lower travel body 2, work instrument 3, and an upper swivel body 4.

Here, directions are defined as follows. The direction in which a man operator (pilot, driver) seated in a driver seat 41a of the upper swivel body 4 faces the front is forward, and the opposite direction is backward. Therefore, when the upper swivel body 4 is in a non-swivel state (swivel angle 0°) relative to the lower travel body 2, the front-back direction of the upper swivel body 4 is the same as the direction in which the lower travel body 2 moves forward and backward. Also, the left side is "left" and the right side is "right" as viewed from the man operator seated in the driver seat 41a. Further, the gravity direction perpendicular to the front-back and left-right directions is defined as the vertical direction, with the upstream side of the gravity direction being "up" and the downstream side being "down." In the drawing, the hydraulic excavator 1 is shown with the upper swivel body 4 in a non-swivel position relative to the lower travel body 2. In addition, in the drawings, if necessary, forward is denoted by a symbol "F", likewise, backward by "B", rightward by "R", leftward by "L", upward by "U", and downward by "D".

The lower travel body 2 is equipped with a pair of crawlers 21 on left and right and a pair of traveling motors 22 on left and right. Each of the traveling motors 22 is a hydraulic motor. The left and right traveling motors 22 drive the left and right crawlers 21, respectively, thereby to move the hydraulic excavator 1 forward and backward. The lower travel body 2 is equipped with a blade 23 and a blade cylinder 23a for leveling work. The blade cylinder 23a is a hydraulic cylinder to rotate the blade 23 in the vertical direction.

The work instrument 3 has a boom 31, an arm 32, and a bucket 33. The boom 31, the arm 32, and the bucket 33 are driven independently there to make it possible to perform excavating of earth and sand.

The boom 31, the arm 32, and the bucket 33 are rotated by an unshown boom cylinder, an unshown arm cylinder, and an unshown bucket cylinder, respectively. The boom cylinder, the arm cylinder, and the bucket cylinder are each constituted of a hydraulic cylinder.

The base end portion of the boom 31, i.e., the end portion opposite the side connected to the arm 32 in the boom 31 is swingably connected to a head end portion 42a of a swivel frame 42 via a bracket 34. That is, the hydraulic excavator 1 in the present embodiment has a boom swing function in which the boom 31 swings to the left or right starting from the head end portion 42a.

The upper swivel body 4 is located above the lower travel body 2 and can be swiveled with respect to the lower travel body 2 via a swivel bearing (not shown). In the upper swivel body 4, an operating portion 41, a swivel frame 42, a swivel motor 43, an engine chamber 44, etc. are located. Being driven with the swivel motor 43 as a hydraulic motor, the upper swivel body 4 swivels via a swivel bearing.

A hydraulic pump 71 (see FIG. 2) is located in the upper swivel body 4. The hydraulic pump 71 is driven by an electric motor 61 (see FIG. 2) inside the engine chamber 44. The hydraulic pump 71 supplies hydraulic oil (pressure oil) to the hydraulic motor (e.g., left and right traveling motors 22, swivel motor 43), and the hydraulic cylinder (e.g., blade cylinder 23a, boom cylinder, arm cylinder, bucket cylinder). The hydraulic motor and the hydraulic cylinder that are driven with the hydraulic oil supplied from the hydraulic pump 71 are collectively referred to as a hydraulic actuator 73 (see FIG. 2).

The driver seat 41a is located in the operating portion 41. Various levers 41b are located around the driver seat 41a. Upon the man operator seated on the driver seat 41a operates the lever 41b, the hydraulic actuator 73 is driven. This allows the lower travel body 2 to travel, the blade 23 to perform the ground leveling work, the work instrument 3 to perform the excavation work, and the upper swivel body 4 to swivel, etc.

A battery unit 53 is located in the upper swivel body 4. That is, the hydraulic excavator 1 is equipped with the battery unit 53. The battery unit 53 is constituted of a lithium-ion battery unit, for example, and is an energy storage device that stores power to drive the electric motor 61. The battery unit 53 may be constituted of a plurality of battery cells as a unit or may be constituted of a single battery cell. A power feed port 50 (see FIG. 3) is provided at the back portion of the upper swivel body 4. The power feed port 50, and a commercial power source 51 as an external power source are connected via a power feed cable 52. This can charge the battery unit 53.

The upper swivel body 4 is further equipped with a lead battery 54. The lead battery 54 outputs a low-voltage (e.g., 12 V) DC voltage. The output from the lead battery 54 is supplied as control voltage to, for example, a system controller 67 (see FIG. 2), a driver of a fan 92 (see FIG. 4), etc.

The hydraulic excavator 1 may be so configured as to be a combination of a hydraulic instrument such as a hydraulic actuator 73 and an actuator driven by electric power. Actuators driven by electric power include, for example, electric travel motors, electric cylinders, and electric swivel motors.

2. Configuration of Electric and Hydraulic Systems

Figure 2:
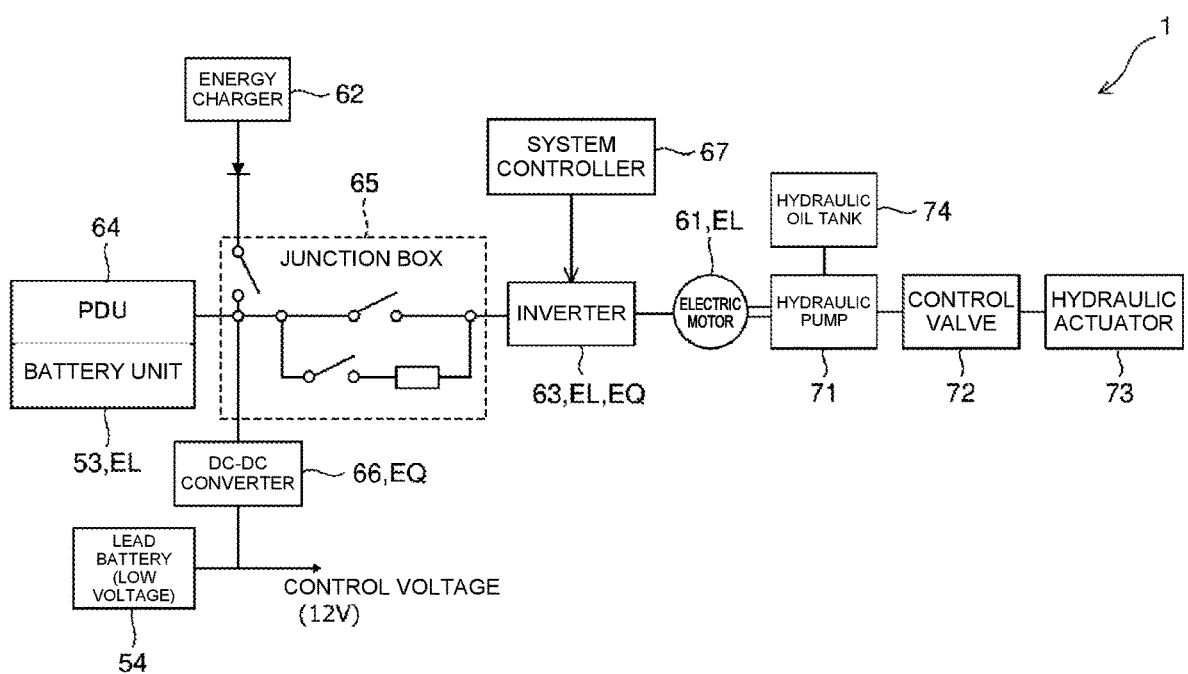
FIG. 2 is a block diagram schematically showing the electrical and hydraulic configurations of the hydraulic excavator.

FIG. 2 is a block diagram schematically showing the electric and hydraulic systems of the hydraulic excavator 1. The hydraulic excavator 1 has the electric motor 61, a charger 62, an inverter 63, a PDU (Power Distribution Unit) 64, a junction box 65, a DC-DC converter 66, and the system controller 67. The system controller 67 is constituted of an electronic control unit, also called an ECU (Electronic Control Unit), and electrically controls each part of the hydraulic excavator 1.

The electric motor 61 is driven by electric power supplied from the battery unit 53 via the junction box 65 and the inverter 63. The electric motor 61 is constituted of a permanent magnet motor or an induction motor. On the swivel frame 42, the electric motor 61 is supported by a motor support portion 100 (see FIG. 3, etc.).

Into DC voltage, the charger 62 (also called a power feeder) converts AC voltage supplied from the commercial power source 51, shown in FIG. 1, via the power feed cable 52. Into AC voltage, the inverter 63 converts the DC voltage supplied from the battery unit 53, and supplies the AC voltage to the electric motor 61. This rotates the electric motor 61. The AC voltage (current) is supplied from the inverter 63 to the electric motor 61 based on the rotation command output from the system controller 67.

The PDU 64 is a battery control unit that controls an internal battery relay thereby to control the inputting and outputting of the battery unit 53. The PDU 64 is located above the battery unit 53 (see FIG. 4).

The junction box 65 includes a charger relay, an inverter relay, a fuse, etc. The voltage output from the charger 62 is supplied to the battery unit 53 via the junction box 65 and the PDU 64. Further, the voltage output from the battery unit 53 is supplied to the inverter 63 via the PDU 64 and the junction box 65.

To a lower voltage (e.g., 12 V), the DC-DC converter 66 steps down the high-voltage (e.g., 300 V) DC voltage supplied from the battery unit 53 via the junction box 65. Like the output from the lead battery 54, the voltage output from the DC-DC converter 66 is supplied to the system controller 67, the driver of the fan 92, etc. Note that the DC-DC converter 66 may be located within the PDU 64.

A plurality of hydraulic pumps 71 are connected to the rotary shaft (output shaft) of the electric motor 61. The plurality of hydraulic pumps 71 include variable displacement and fixed displacement pumps. FIG. 2 shows one hydraulic pump 71 only as an example. Each hydraulic pump 71 is connected to a hydraulic oil tank 74. When the hydraulic pump 71 is driven by the electric motor 61, the hydraulic oil in the hydraulic oil tank 74 is supplied to the hydraulic actuator 73 via the hydraulic pump 71 and the control valve 72. This drives the hydraulic actuator 73. The control valve 72 is a direction-switching valve that controls the flow direction and flow rate of the hydraulic oil supplied from the hydraulic pump 71 to the hydraulic actuator 73.

Thus, the hydraulic excavator 1 is equipped with the hydraulic pump 71 driven by the electric motor 61. Also, the hydraulic excavator 1 is equipped with the hydraulic actuator 73 driven by the hydraulic oil supplied from the hydraulic pump 71. In addition, the hydraulic excavator 1 is equipped with a hydraulic oil tank 74 that contains the hydraulic oil.

Via a piping RP, the electric instrument EL such as the battery unit 53, the electric motor 61, and the inverter 63 are connected to a radiator 91a (see FIG. 3) to be described below. Refrigerant supplied from the radiator 91a flows in the piping RP. Then, the refrigerant flowing in the piping RP passes through in the electric instrument EL. Therefore, cooling the refrigerant by heat exchange in the radiator 91a and supplying the refrigerant from the radiator 91a to the electric instrument EL can cool (water-cool) the electric instrument EL. Thus, the hydraulic excavator 1 is equipped with the electric instrument EL through which the refrigerant passes. The refrigerant is, for example, cooling water.

3. Configuration in Engine Chamber

Figure 3:
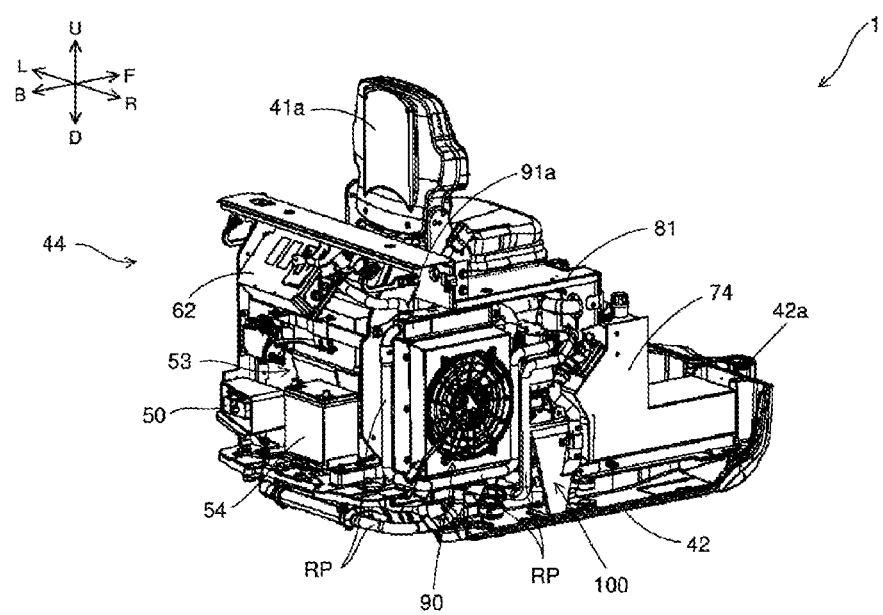
FIG. 3 is a perspective view showing an overall configuration in an engine chamber of the hydraulic excavator.

FIG. 3 is a back perspective view of the overall configuration in the engine chamber 44 of the hydraulic excavator 1. The driver seat 41a is located on a seat mount 81. The battery unit 53 is located between the seat mount 81 and the swivel frame 42. The battery unit 53 is located on the swivel frame 42, on the back side, and off to the left of the center in the left-right direction. In the present embodiment, two battery cells 53a (see FIG. 4) are vertically located alongside thereby to form one battery unit 53. The number of battery cells 53a constituting the battery unit 53 is not particularly limited. Behind the battery unit 53 on the swivel frame 42, the lead battery 54 and the power feed port 50 are located alongside the left-right direction. The charger 62 is located at the upper back portion of the battery unit 53.

A cooling device 90 is located to the right of the battery unit 53. That is, the hydraulic excavator 1 is equipped with the cooling device 90. The cooling device 90 is a device that cools at least one of the refrigerant and the hydraulic oil by the heat exchange.

Figure 4:
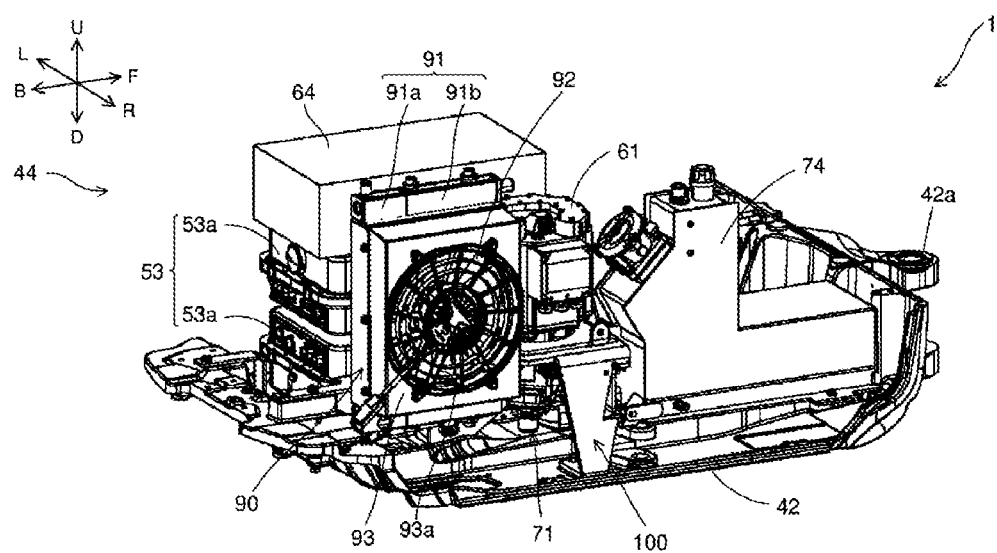
FIG. 4 is a perspective view showing a main portion in the engine chamber.

FIG. 4 is a back perspective view of the main portion in the engine chamber 44 of the hydraulic excavator 1. The cooling device 90 includes a heat exchanger 91, the fan 92, and a fan shroud 93. The heat exchanger 91 includes a radiator 91a and an oil cooler 91b. By heat exchange, the radiator 91a cools the refrigerant passing through the electric instrument EL. The oil cooler 91b is connected to an oil path circulating via the hydraulic pump 71, the hydraulic actuator 73 (see FIG. 2), etc., and, by the heat exchange, cools the hydraulic oil flowing in the oil path. The radiator 91a and the oil cooler 91b are located alongside the front-back direction. Further, the radiator 91a and the oil cooler 91b are located opposite the fan 92.

The fan 92 generates airflow across the heat exchanger 91. In the present embodiment, the fan 92 is located on the right side of the heat exchanger 91, i.e., opposite the battery unit 53 with respect to the heat exchanger 91. The fan 92 is covered with the fan shroud 93. The fan shroud 93 is a cover having an air vent 93a, and covers the fan 92 from the right side.

When the fan 92 is rotated, air (wind) flowing from the inside of the engine chamber 44 across the heat exchanger 91 is discharged to the outside of the hydraulic excavator 1 via the air vent 93a of the fan shroud 93. That is, the air flows through a gap between the radiator 91a and the oil cooler 91b. This cools the heat exchanger 91. That is, the refrigerant flowing through radiator 91a and the hydraulic oil flowing through the oil cooler 91b are cooled by the heat exchange. This type of driving the fan 92 is called a "discharging type".

The drive type of fan 92 may be a "sucking type". In the sucking type, when the fan 92 is rotated, air outside the hydraulic excavator 1 is sucked into the engine chamber 44 through the air vent 93a of the fan shroud 93. The air sucked in by the fan 92 flows toward the heat exchanger 91, and runs across the heat exchanger 91. This cools the heat exchanger 91.

It is allowed that the heat exchanger 91 is constituted of only one of the radiator 91a and the oil cooler 91b, and the other is located in a different position and cooled by a separate fan. However, it is preferable that the heat exchanger 91 should include both the radiator 91a and the oil cooler 91b, in the respect that one fan 92 can cool both the radiator 91a and the oil cooler 91b simultaneously (efficiently).

The above hydraulic oil tank 74 is located forward of the cooling device 90 on the swivel frame 42. Then, on the swivel frame 42, and between the cooling device 90 and the hydraulic oil tank 74, the electric motor 61 and hydraulic pump 71 are located. The electric motor 61 is supported on the swivel frame 42 by the motor support portion 100. The hydraulic excavator 1 is equipped with the motor support portion 100 that supports the electric motor 61 on the swivel frame 42 as a machine body frame. Details of the motor support portion 100 are to be described below.

Figure 5:
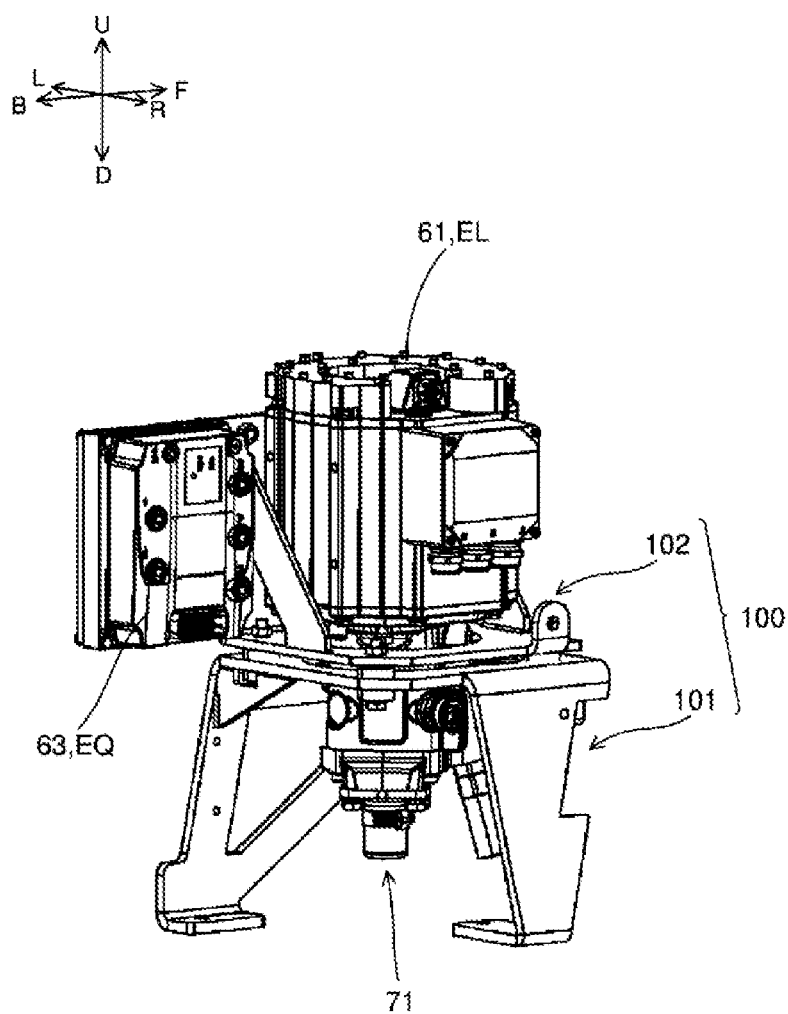
FIG. 5 is a perspective view of a motor support portion with the electric motor being supported.
Figure 6:
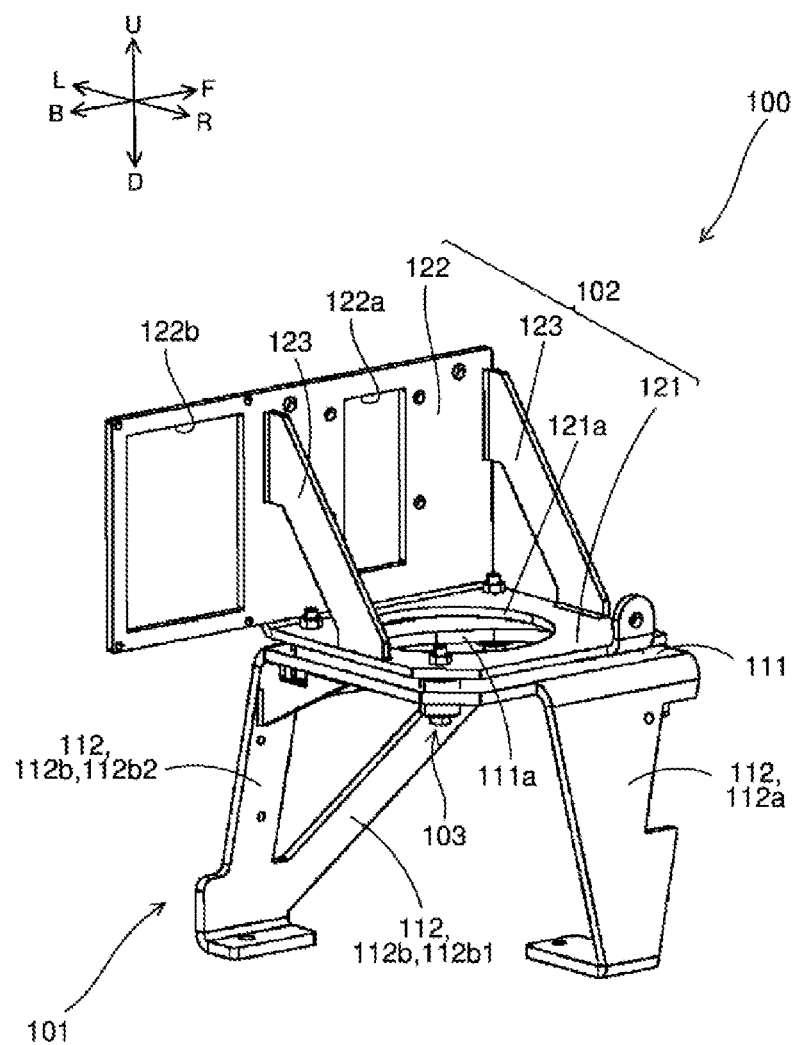
FIG. 6 is a perspective view of the motor support portion alone.

FIG. 5 shows a perspective view of the motor support portion 100 with the electric motor 61 being supported. Also, FIG. 6 is a perspective view of the motor support portion 100 alone. The motor support portion 100 has a first support portion 101 and a second support portion 102. With bolts and nuts (hereinafter referred to as "bolts, etc."), the first support portion 101 is attached to the swivel frame 42 (see FIG. 4) as the machine body frame. The second support portion 102 is located above the first support portion 101 and supports the electric motor 61. With a fastener 103, the second support portion 102 is attached to the first support portion 101. This allows the second support portion 102 to be supported by the first support portion 101. The fasteners 103 include, for example, bolts, nuts, and anti-vibration rubber.

The first support portion 101 has an upper plate portion 111, a leg portion 112. The upper plate portion 111 is a flat plate extending in the left-right and front-back directions, and, on the inside thereof, has an upper plate opening portion 111a through which the hydraulic pump 71 (see FIG. 5) passes.

The leg portion 112 includes a first leg portion 112a and a second leg portion 112b. The first leg portion 112a is connected to the right side edge portion of the upper plate portion 111, is narrower downward in width in the front-back direction, and has a lower end portion bending to the left side. The lower end portion of the first leg portion 112a is fixed to the swivel frame 42 with bolts or the like.

The second leg portion 112b has a front leg portion 112b1 and a back leg portion 112b2. Upper end portions of the front leg portion 112b1 and the back leg portion 112b2 are connected to the front and back of the left side edge portion of the upper plate portion 111, respectively. The front leg portion 112b1 and the back leg portion 112b2 narrow their distance from each other downward and meet (merge) in one place. Lower end portions of the front leg portion 112b1 and back leg portion 112b2 (merging end portions) are bent to the right, and fixed to the swivel frame 42 with bolts or the like. This attaches the first support portion 101 to the swivel frame 42.

The second support portion 102 has a bottom plate portion 121, and a fixing plate portion 122. The bottom plate portion 121 is a flat plate extending in the left-right and front-back directions, and, on the inside thereof, has a bottom plate opening portion 121a through which the hydraulic pump 71 (see FIG. 5) passes.

The fixing plate portion 122 is a flat plate caused to stand on the left edge portion of the bottom plate portion 121. The angle defined between the bottom plate portion 121 and the fixing plate portion 122 is substantially 90°. The electric motor 61 (see FIG. 5) is fixed to the fixing plate portion 122 with bolts or the like.

With the electric motor 61 fixed to the fixing plate portion 122, the output shaft of the electric motor 61 is located along the vertical direction. That is, the electric motor 61 is fixed to the fixing plate portion 122 with the output shaft facing up and down. The electric motor 61 is fixed to the fixing plate portion 122 in a manner to be located above the bottom plate portion 121. Therefore, with the electric motor 61 fixed to the fixing plate portion 122, the bottom plate portion 121 is located lower than the electric motor 61. That is, the motor support portion 100 has the bottom plate portion 121 located below the electric motor 61.

The fixing plate portion 122 extends backward (cooling device 90 side) from the bottom plate portion 121. To the fixing plate portion 122's portion that protrudes backward from the bottom plate portion 121, the inverter 63 as an electric component EQ is attached with bolts or the like. Thus, in the fixing plate portion 122, the electric component EQ is located alongside the electric motor 61 in the front-back direction.

As shown in FIG. 6, the fixing plate portion 122 has a first opening portion 122a and a second opening portion 122b provided alongside the front-back direction. The first opening portion 122a and the second opening portion 122b are openings for heat dissipation of the electric motor 61 and inverter 63, and are formed corresponding to positions of mounting the electric motor 61 and the inverter 63.

Reinforcing members 123 are provided at the front and back edges of the bottom plate portion 121. Each reinforcement member 123 extends diagonally leftward and upward from the bottom plate portion 121, and has an end connected to the fixing plate portion 122, respectively. This reinforces the fixing plate portion 122 to the bottom plate portion 121.

Figure 7:
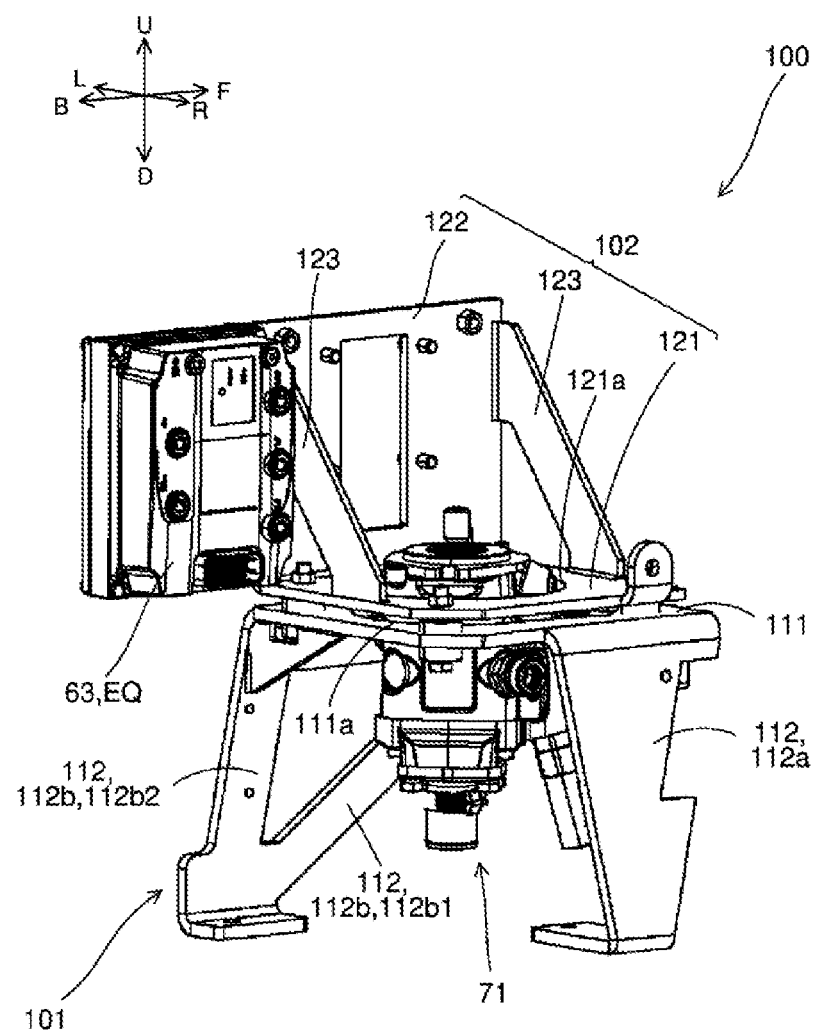
FIG. 7 is a perspective view showing the positional relationship between a hydraulic pump and the motor support portion.

FIG. 7 is a perspective view showing the positional relationship between the hydraulic pump 71 and the motor support portion 100. For convenience, FIG. 7 omits the electric motor 61 to which the hydraulic pump 71 is connected. Penetrating through the bottom plate opening portion 121a and the upper plate opening portion 111a of the motor support portion 100, the hydraulic pump 71 is connected to the electric motor 61. Since the output shaft of the electric motor 61 is along the vertical direction as described above, the input shaft of the hydraulic pump 71, which is connected to the output shaft, is also along the vertical direction. The hydraulic pump 71 is not supported by the motor support portion 100, but is connected (directly) to the electric motor 61 and suspended in midair. A support member to support the hydraulic pump 71 on the swivel frame 42 may be separately provided.

Mounting the electric motor 61 to the swivel frame 42 using the motor support portion 100 is performed, for example, in the following procedure. (1) The output shaft of the electric motor 61 is connected to the input shaft of the hydraulic pump 71 via a coupling (not shown). (2) Pass the hydraulic pump 71 through the bottom plate opening portion 121a, and then attach the electric motor 61 attached to the fixing plate portion 122 with bolts, etc. (3) Attach the inverter 63 to the fixing plate portion 122 with bolts or the like. (4) With a fastener 103, connect the second support portion 102 and the first support portion 101. At this time, the hydraulic pump 71 is located in a manner to pass through the upper plate opening portion 101a of the first support portion 101. (5) Fix the lower end portion of the first support portion 101 to the swivel frame 42 with bolts, etc. The order of (2) and (3) may be reversed. Also, the order of (4) and (5) may be reversed.

As shown in FIG. 5, the electric motor 61 is located above relative to the hydraulic pump 71. That is, the electric motor 61 and hydraulic pump 71 are vertically located alongside. In such locating, compared to a configuration in which, for example, the electric motor 61 and hydraulic pump 71 are located alongside the left-right direction (horizontally-mounted configuration), the total space occupied by the electric motor 61 and hydraulic pump 71 can be reduced when viewed from above.

Figure 8:
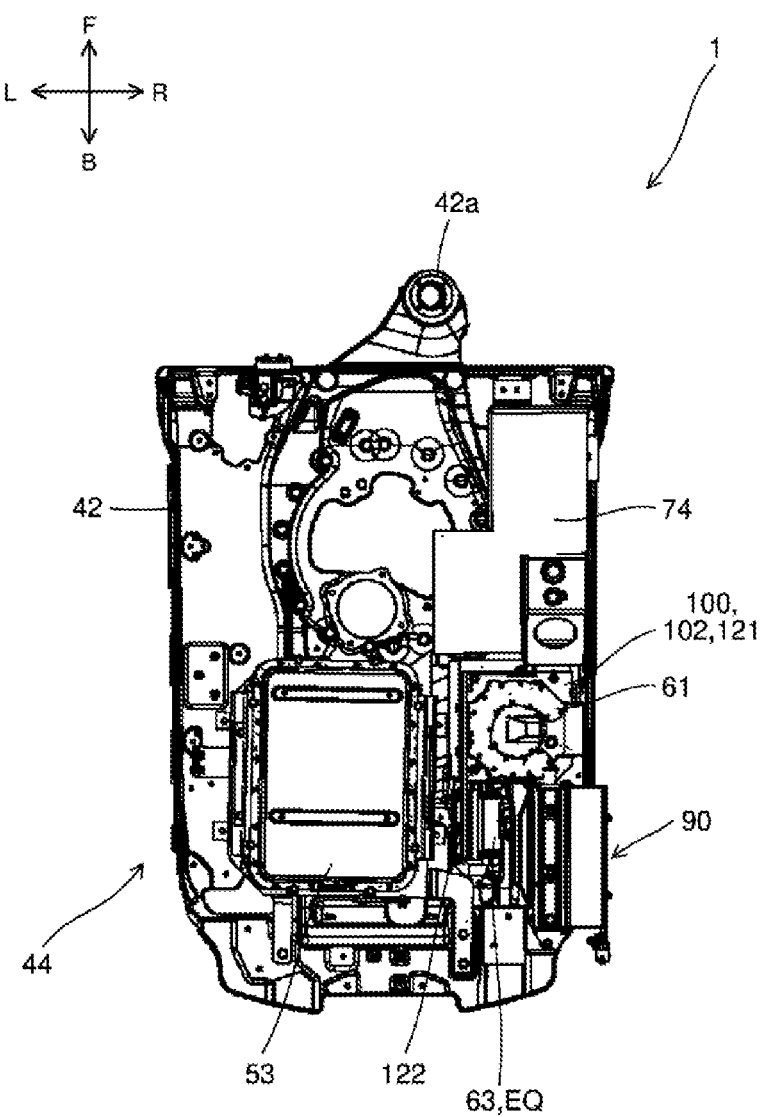
FIG. 8 is a plan view showing the configuration of the main portion in the engine chamber.
Figure 9:
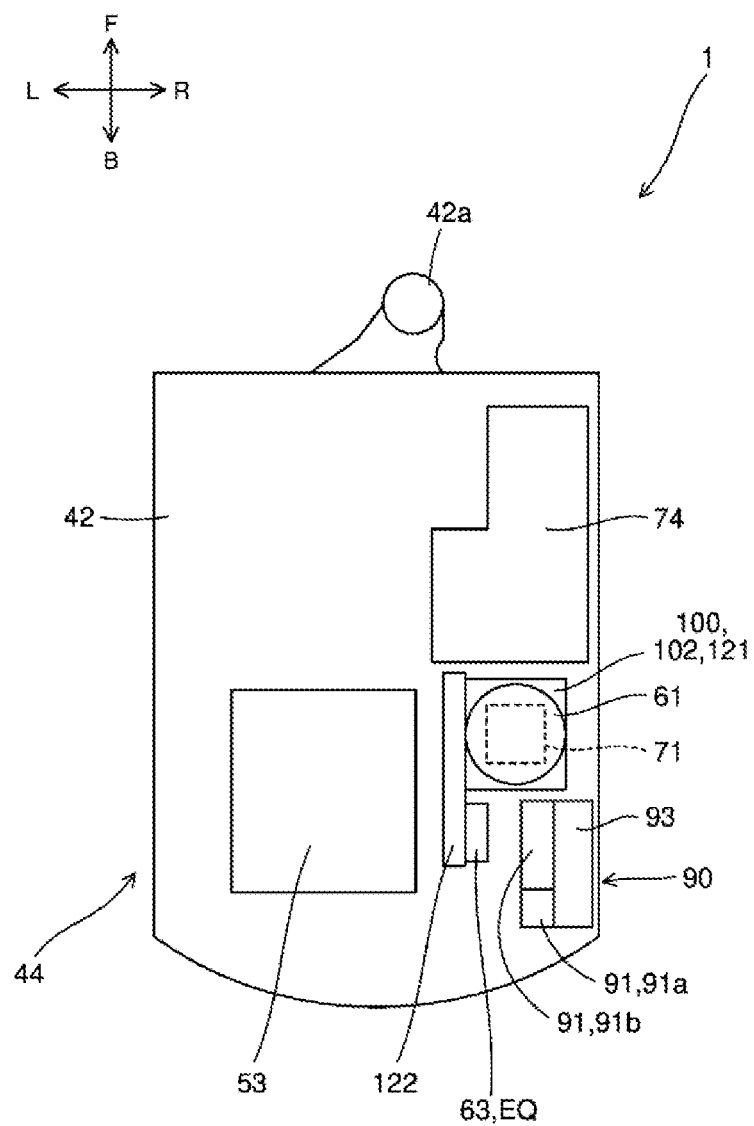
FIG. 9 is a schematic plan view of the configuration of the main portion.

FIG. 8 is a plan view showing the configuration of the main portion in the engine chamber 44 of the hydraulic excavator 1. FIG. 9 is a schematic plan view of the configuration in FIG. 8. From these figures, the following points are clear. That is, in a configuration where the electric motor 61 and the hydraulic pump 71 are vertically located alongside, the hydraulic pump 71 can be located within the space occupied by the electric motor 61 on the swivel frame 42 (see especially FIG. 9). This allows the total occupied space of the electric motor 61 and hydraulic pump 71 to be reduced compared to the horizontally-mounted configuration. This means that when the electric motor 61 and hydraulic pump 71 are located on the side of the battery unit 53 mounted on the swivel frame 42 (in either the front, back, left, or right direction), the installation space for the battery unit 53 can be expanded in the lateral direction compared to the horizontally-mounted configuration. Thus, even a small electrically powered hydraulic excavator 1 can be equipped with a large battery unit 53 (a battery unit 53 with sufficient capacity) thereby to extend the operating time of the hydraulic excavator 1.

When the electric motor 61 and the hydraulic pump 71 are vertically located alongside, the output shaft of the electric motor 61 and the input shaft of the hydraulic pump 71 need not be vertically located alongside. For example, it may be so configured that the hydraulic pump 71 is located below the electric motor 61, and the output shaft of the electric motor 61 and the input shaft of the hydraulic pump 71 are each located in a manner to extend horizontally, and a power transmission mechanism having a shaft, a gear, etc. is interposed between the output shaft and the input shaft. In this configuration, power is transmitted from the electric motor 61 via the power transmission mechanism to the hydraulic pump 71, thereby to drive the hydraulic pump 71.

However, in terms of simplifying the configuration by eliminating the need to install the power transmission mechanism, it is preferable that the output shaft of the electric motor 61 and the input shaft of the hydraulic pump 71 be located along the top and bottom, as in the present embodiment. That is, it is preferable that the electric motor 61 and the hydraulic pump 71 be connected in a vertical direction, as shown in FIG. 5 and the like.

Adopting the layout of suspending the hydraulic pump 71 relative to the electric motor 61 eliminates the need of a support mechanism of the hydraulic pump 71. From this viewpoint, it is preferable that the hydraulic pump 71 be located below the electric motor 61. Positioning the hydraulic pump 71 below the electric motor 61 places the hydraulic pump 71 in a position closer to the swivel frame 42. This facilitates the arrangement and optimization of the hydraulic hoses extending from the hydraulic pump 71 to the hydraulic oil tank 74 and control valve 72 (see FIG. 2) set on the swivel frame 42.

In the configuration where the electric motor 61 is supported on the swivel frame 42 by the motor support portion 100; from the viewpoint of easily realizing a layout in which the hydraulic pump 71 is located below the electric motor 61, as shown in FIG. 7, it is preferable that the hydraulic pump 71 be located through the bottom plate portion 121 of the motor support portion 100.

From the viewpoint of facilitating the operation of fixing the electric motor 61 to the motor support portion 100 and the operation of fixing the motor support portion 100 to the swivel frame 42, it is preferable to preliminarily divide the motor support portion 100 into two support portions so that each of the fixing operations can be performed for a separate support portion. For this purpose, it is preferable to use a configuration where the motor support portion 100 is preliminarily divided into the first support portion 101 and the second support portion 102, and the second support portion 102 the electric motor 61 is supported on the first support portion 101 attached to the swivel frame 42, as in the present embodiment.

In addition, from the viewpoint of reliably realizing, in the motor support portion 100, the support structure for the electric motor 61, it is preferable that the second support portion 102 should have the bottom plate portion 121 and the fixing plate portion 122 that is caused stand on the bottom plate portion 121 and to which the electric motor 61 is fixed.

In view of effective use of the fixing plate portion 122, it is preferable if the fixing plate portion 122, to which the electric motor 61 is fixed, could also be used as a member to hold a component other than the electric motor 61. From this viewpoint, as shown in FIG. 7, it is preferable that the fixing plate portion 122 should hold the electric component EQ (in addition to the electric motor 61). That is, this configuration eliminates the need for separately providing a dedicated component to hold the electric component EQ.

From the viewpoint of facilitating the optimization of the arrangement of the wired cables connected to the electric motor 61 and electric component EQ, it is preferable that, in the fixing plate portion 122, the electric component EQ should be located alongside the electric motor 61 (e.g., in the front-back direction).

In the present embodiment, the inverter 63 is used as the example of the electric component EQ to be fixed to the fixing plate portion 122; however, the electric component EQ is not limited to the inverter 63. The electric component EQ to be fixed to the fixing plate portion 122 may be, for example, the DC-DC converter 66 (see FIG. 2). However, since the inverter 63 supplies a high voltage to the electric motor 61, it is also preferable to place the inverter 63 and the electric motor 61 together (close to each other) so as to facilitate the arrangement of these connecting cables. In this respect, it is preferable that, as in the present embodiment, the electric component EQ to be fixed to the fixing plate portion 122 should include the inverter 63.

Directing, to the electric component EQ, the wind (airflow) that is generated by the driving of the fan 92 of the cooling device 90 shown in FIG. 4 and that crossed the heat exchanger 91, in other words, the airflow used to cool the heat exchanger 91 can increase the cooling efficiency of the electric component EQ, which is preferable. In this respect, it is preferable that the inverter 63 as the electric component EQ should be located facing the cooling device 90. As shown in FIGS. 8 and 9, the above positional relation can be easily realized by placing the inverter 63 between the battery unit 53 and the cooling device 90.

From the view point of effective utilization of the space between the hydraulic oil tank 74 and the cooling device 90 on the swivel frame 42, as shown in FIGS. 8 and 9, the electric motor 61 should be located between the hydraulic oil tank 74 and the cooling device 90.

Particularly, in the configuration where the electric motor 61 is cooled by the refrigerant; from the viewpoint of obtaining the effect of the present embodiment described above, it is preferable that the electric instrument EL through which the refrigerant passes should include the electric motor 61.

From the viewpoint of effectively utilizing, on the swivel frame 42, the (narrow) space between the electric motor 61 and the battery unit 53; as shown in FIGS. 9 and 10, it is preferable that the fixing plate portion 122 of the motor support portion 100 should be located between the electric motor 61 and the battery unit 53. Also, with the above locating of the fixing plate portion 122, for example, during maintenance of the electric motor 61, the electric motor 61 can be accessed from the opposite side of the battery unit 53 (by opening a hood). Therefore, the above locating of the fixing plate portion 122 is also preferable in being capable of improving maintainability (workability of maintenance).

The description has been made with the hydraulic excavator 1, which is a construction machine, as the example of the electric work machine, but the electric work machine is not limited to the hydraulic excavator 1 and may be any other construction machine such as a wheel loader, or a compact truck loader. Also, the electric work machine may be an agricultural machine such as a combine harvester, and a tractor.

4. Appendices

The hydraulic excavator 1 described in the present embodiment can also be expressed as an electric work machine as shown in the following Appendix.

An electric work machine of appendix (1) includes: an electric motor; an energy storage device that stores electric power for driving the electric motor; and a hydraulic pump driven by the electric motor, wherein the electric motor and the hydraulic pump are vertically located alongside (on the side of the electric motor).

The electric work machine of appendix 2, in the electric work machine according to appendix 1, the electric motor and the hydraulic pump are connected in a vertical direction.

The electric work machine of appendix 3, in the electric work machine according to appendix 2, the hydraulic pump is located below the electric motor.

The electric work machine of appendix 4, in the electric work machine according to appendix 3, further including: a motor support portion that supports the electric motor on a machine body frame, wherein the motor support portion has a bottom plate portion located below the electric motor, and the hydraulic pump passes through the bottom plate portion.

The electric work machine of appendix 5, in the electric work machine according to appendix 4, the motor support portion has: a first support portion attached to the machine body frame, and a second support portion that supports the electric motor, and the second support portion is supported by the first support portion.

The electric work machine of appendix 6, in the electric work machine according to appendix 5, the second support portion has a bottom plate portion, and a fixing plate portion caused to stand on the bottom plate portion to which the electric motor is fixed.

The electric work machine of appendix 7, in the electric work machine according to appendix 6, the fixing plate portion is located between the electric motor and the energy storage device.

The electric work machine of appendix 8, in the electric work machine according to appendix 6 or 7, the fixing plate portion holds the electric component.

The electric work machine of appendix 9, in the electric work machine according to appendix 8, in the fixing plate portion, the electric component is located alongside the electric motor.

The electric work machine of appendix 10, in the electric work machine according to appendix 8 or 9, the electric component includes an inverter.

The electric work machine of appendix 11, in the electric work machine according to any of appendices 8 to 10, further comprising: a hydraulic actuator driven by a hydraulic oil supplied from the hydraulic pump, an electric instrument through which a refrigerant passes, and a cooling device that cools at least one of the refrigerant and the hydraulic oil by heat exchange, wherein the electric component is located opposite to the cooling device.

The electric work machine of appendix 12, in the electric work machine according to appendix 11, further including: a hydraulic oil tank that contains the hydraulic oil, wherein the electric motor is located between the hydraulic oil tank and the cooling device.

The electric work machine of appendix 13, in the electric work machine according to appendix 11 or 12, the electric instrument includes the electric motor.

The embodiment of the present invention has been described above, but the scope of the present invention is not limited thereto and can be carried out within an extended or modified range without departing from the gist of the present invention.

INDUSTRIAL APPLICABILITY

The present invention is applicable to work machines such as a construction machine and an agricultural machine, for example.

REFERENCE SIGNS LIST 1 hydraulic excavator (electric work machine)
42 swivel frame (machine body frame)
53 battery unit (energy storage device, electric instrument)
61 electric motor (electric instrument)
63 inverter (electric instrument, electric component)
66 DC-DC converter (electric component)
71 hydraulic pump
73 hydraulic actuator
74 hydraulic oil tank
90 cooling device
91 heat exchanger
91a radiator (heat exchanger)
91b oil oil cooler (heat exchanger)
92 fan
93 fan shroud
93a air vent
100 motor support portion
101 first support portion
102 second support portion
121 bottom plate portion
122 fixing plate portion
EL electric instrument
EQ electric component

The invention claimed is:

1. An electric earth-moving machine comprising:
an electric motor;
an energy storage device that stores electric power for driving the electric motor; and
a hydraulic pump driven by the electric motor;
wherein the electric motor and the hydraulic pump are vertically aligned and connected in a vertical direction; and
wherein the hydraulic pump is located below the electric motor.

2. The electric earth-moving machine according to claim 1, further comprising:
a motor support portion that supports the electric motor on a machine body frame, wherein
the motor support portion has a bottom plate portion horizontally placed which is located below the electric motor, and
the hydraulic pump passes through the bottom plate portion.

3. The electric earth-moving machine according to claim 2,
wherein the motor support portion has:
a first support portion attached to the machine body frame, and a second support portion that supports the electric motor, and
the second support portion is supported by the first support portion.

4. The electric earth-moving machine according to claim 3, wherein the second support portion has
the bottom plate portion, and
a fixing plate portion extending vertically from the bottom plate portion and to which the electric motor is fixed.

5. The electric earth-moving machine according to claim 4, wherein the fixing plate portion is located between the electric motor and the energy storage device.

6. The electric earth-moving machine according to claim 4, wherein the fixing plate portion holds an electric component.

7. The electric earth-moving machine according to claim 6, wherein, on the fixing plate portion, the electric component is located next to alongside the electric motor.

8. The electric earth-moving machine according to claim 6, wherein the electric component includes an inverter.

9. The electric earth-moving machine according to claim 6, further comprising:
a hydraulic actuator driven by a hydraulic oil supplied from the hydraulic pump,
an electric instrument through which a refrigerant passes, and
a cooling device that cools at least one of the refrigerant and the hydraulic oil by heat exchange,
wherein the electric component is located facing the cooling device.

10. The electric earth-moving machine according to claim 9, further comprising:
a hydraulic oil tank that contains the hydraulic oil,
wherein the electric motor is located between the hydraulic oil tank and the cooling device.

11. The electric earth-moving machine according to claim 9, wherein the electric instrument includes the electric motor.

12. The electric earth-moving machinery according to claim 2, wherein the bottom plate portion having an opening which the hydraulic pump passes through.

13. The electric earth-moving machine according to claim 2, wherein the electric motor is larger than the hydraulic pump.

14. The electric earth-moving machine according to claim 4, wherein the electric motor is fixed to the fixing plate portion with an output shaft facing up and down.

15. The electric earth-moving machine according to claim 2, wherein the bottom plate portion is located lower than the electric motor.

16. The electric earth-moving machine according to claim 2, wherein the electric motor is spaced away from the bottom plate portion.

* * * * *